(12) United States Patent
Beaudin et al.

(10) Patent No.: US 10,882,621 B2
(45) Date of Patent: Jan. 5, 2021

(54) RETRACTABLE AIR GASPER APPARATUS

(71) Applicant: BOMBARDIER INC., Dorval (CA)

(72) Inventors: Nikolas Beaudin, Montreal (CA); Bruce Malek, Senneville (CA)

(73) Assignee: BOMBARDIER INC., Dorval (CA)

( * ) Notice: Subject to any disclaimer, the term of this patent is extended or adjusted under 35 U.S.C. 154(b) by 818 days.

(21) Appl. No.: 15/504,710

(22) PCT Filed: Jul. 28, 2015

(86) PCT No.: PCT/IB2015/055696
§ 371 (c)(1),
(2) Date: Feb. 17, 2017

(87) PCT Pub. No.: WO2016/027183
PCT Pub. Date: Feb. 25, 2016

(65) Prior Publication Data
US 2017/0267357 A1 Sep. 21, 2017

Related U.S. Application Data

(60) Provisional application No. 62/040,179, filed on Aug. 21, 2014.

(51) Int. Cl.
*B64D 13/00* (2006.01)
(52) U.S. Cl.
CPC ........ *B64D 13/00* (2013.01); *B64D 2013/003* (2013.01)
(58) Field of Classification Search
CPC .................. B64D 2013/003; B64D 13/00; B60H 1/3442; F24F 13/065
See application file for complete search history.

(56) References Cited

U.S. PATENT DOCUMENTS

| 4,848,669 A | 7/1989 | George |
| 5,127,876 A | 7/1992 | Howe et al. |

(Continued)

FOREIGN PATENT DOCUMENTS

| CA | 2819982 | 6/2013 |
| DE | 1218892 B | 6/1966 |

(Continued)

OTHER PUBLICATIONS

The State Intellectual Property Office of the People's Republic of China, Notification of First Office Action dated Jun. 4, 2018 re: Application No. 201580044267.3.

(Continued)

*Primary Examiner* — Steven S Anderson, II
(74) *Attorney, Agent, or Firm* — Norton Rose Fulbright Canada LLP

(57) ABSTRACT

An air gasper (air) for a vehicle includes an air inlet (26), a first housing (24) disposable through a panel in the vehicle (12), the first housing (24) being connected to the air inlet (26), a second housing (70) disposed within the first housing (24), an air outlet (72) disposed within the second housing (70), downstream of the air inlet (26), and a first mechanism (102, 70) connected between the first housing (24) and the second housing (70). The first mechanism (102, 70) permits the second housing (70) to be stowed within the first housing (24) in a stowed position and also permits the second housing (70) to extend outwardly from the first housing (24) in a deployed position.

15 Claims, 14 Drawing Sheets

(56) References Cited

U.S. PATENT DOCUMENTS

| | | | |
|---|---|---|---|
| 5,162,018 | A | 11/1992 | Horton |
| 5,328,152 | A | 7/1994 | Castle |
| 5,399,119 | A | 3/1995 | Birk et al. |
| 6,402,610 | B1 | 6/2002 | Gloisten |
| 6,610,116 | B1 | 8/2003 | Avery |
| 6,719,623 | B1 | 4/2004 | Kodaveridan et al. |
| 6,887,147 | B2 | 5/2005 | Thomassin et al. |
| 6,955,592 | B2 | 10/2005 | Pieper et al. |
| 7,014,557 | B2 | 3/2006 | Thomassin et al. |
| 7,070,496 | B2 | 7/2006 | Thomassin et al. |
| 7,093,821 | B2 | 8/2006 | Howe |
| 7,527,402 | B2 | 5/2009 | Scown et al. |
| 8,016,650 | B2 | 9/2011 | Horstman et al. |
| 8,342,921 | B2 | 1/2013 | Huber et al. |
| 2004/0005853 | A1 | 1/2004 | Thomassin et al. |
| 2004/0171342 | A1 | 9/2004 | Kodaveridan et al. |
| 2005/0258391 | A1* | 11/2005 | Howe .................. B60H 1/3442 251/345 |
| 2006/0116063 | A1 | 6/2006 | Seume et al. |
| 2009/0163131 | A1 | 6/2009 | Walkinshaw et al. |
| 2010/0230627 | A1* | 9/2010 | Jones .................. B60H 1/3442 251/359 |
| 2013/0115868 | A1* | 5/2013 | Davis .................... B64D 13/00 454/76 |
| 2013/0118493 | A1 | 5/2013 | Umlauft et al. |
| 2013/0203332 | A1 | 8/2013 | Fernandes et al. |
| 2015/0202946 | A1* | 7/2015 | Inagaki ................ B60H 1/3428 454/154 |

FOREIGN PATENT DOCUMENTS

| | | |
|---|---|---|
| DE | 102012017189 | 3/2014 |
| GB | 698523 A | 10/1953 |
| WO | 2005102499 | 11/2005 |

OTHER PUBLICATIONS

PCT international Search Report and Written Opinion dated Oct. 14, 2015 re: International Application No. PCT/IB2015/055696.

English translation of German patent document No. DE 102012017189 dated Mar. 6, 2014; www.google.ca/patents . . . .

English translation of claim 1 of German patent document No. DE 1218892 dated Jun. 8, 1966; https://translate.google.ca.

* cited by examiner

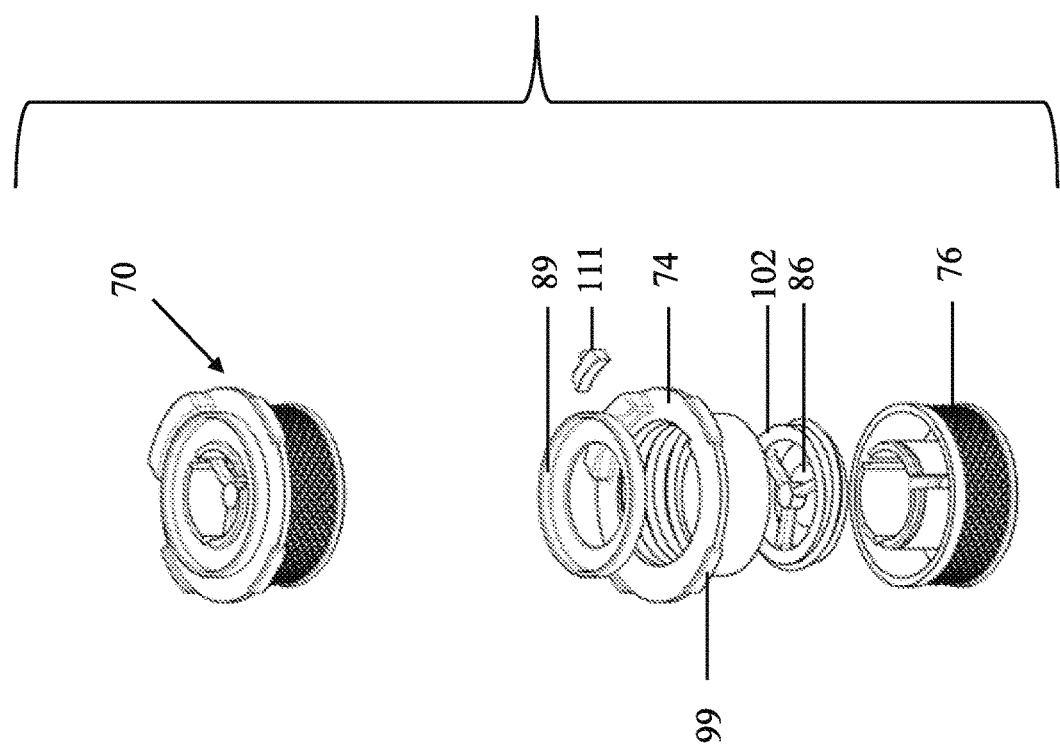

RETRACTABLE AIR GASPER APPARATUS

CROSS-REFERENCE TO RELATED APPLICATION(S)

This application is a national phase application under 35 U.S.C. 371 of International Patent Application No. PCT/IB2015/055696 filed on Jul. 28, 2015, which claims priority from U.S. Provisional Patent Application Ser. No. 62/040,179, filed on Aug. 21, 2014, the entire content of which is incorporated herein by reference.

FIELD OF THE INVENTION

The present invention concerns a retractable air gasper apparatus for controlling the flow of air (velocity and direction) into a passenger compartment of a vehicle. More specifically, the present invention concerns an air gasper apparatus that is provided so that a passenger may adjust the flow of air into the cabin of an aircraft.

DESCRIPTION OF THE RELATED ART

In the prior art, there are numerous examples of air gaspers that are provided to satisfy any of a number of different environmental conditions.

Many of the known air gaspers present a nozzle that extends outwardly from a passenger service unit (PSU) overhead panel in which the air gasper is disposed.

When the nozzle protrudes from the overhead panel, it is conceivable that a passenger may hit the nozzle when being seated or leaving his or her seat.

Separately, there are numerous sidewall panels that may need to be opened to access electrical wires and other system components therebehind. When these sidewall panels are opened, there is the possibility that the gasper nozzle may hit or damage the sidewall panel or the gasper itself.

For several reasons, therefore, a need has developed for improvements to air gaspers that present a more minimal presence in the passenger compartment.

SUMMARY OF THE INVENTION

The present invention addresses one or more of the deficiencies noted with respect to the prior art.

In one contemplated embodiment, the present invention provides an air gasper for a vehicle. The air gasper includes an air inlet, a first housing disposable through a panel in the vehicle, the first housing being connected to the air inlet, a second housing disposed within the first housing, an air outlet disposed within the second housing, downstream of the air inlet, and a first mechanism connected between the first housing and the second housing. The first mechanism permits the second housing to be stowed within the first housing in a stowed position and also permits the second housing to extend outwardly from the first housing in a deployed position.

In a further contemplated embodiment, the air gasper includes a plug associated with the air outlet to open and close the air outlet and a second mechanism connected to the second housing. The second mechanism permits the plug to open and close the air outlet.

In yet another contemplated embodiment, the air gasper also includes a first threaded region on an exterior surface of the first housing, a second threaded region on an interior surface of the first housing, a first ring engageable with the first threaded region, and a second ring engageable with the second threaded region. Here, the first ring and the second ring sandwich the panel therebetween to removably secure the first housing to the panel.

It is contemplated that the first mechanism may include a first biasing member disposed between the first housing and the second housing to bias the second housing in the deployed position.

In addition, the first mechanism may include a locking mechanism to lock the first housing both in the deployed position and in the stowed position.

Still further, the first mechanism may be push-button actuated.

With respect to another contemplated embodiment, the second mechanism may include a plug ring connected to the plug, a third threaded region on an exterior surface of the plug ring, and a fourth threaded region on an interior surface of the second housing. The third threaded region may engage the fourth threaded region so that rotation of the second housing moves the plug ring and plug with respect to the air outlet.

With respect to other embodiments of the air gasper of the present invention, the second housing may include a plug seat at the air outlet. The plug is contemplated to engage the plug seat when in the closed position, and the plug is contemplated to be displaced a distance from the plug seat when in the opened position.

A further embodiment of the air gasper of the present invention contemplates that a second biasing member is disposed between the first housing and the plug ring to bias the plug ring toward the closed position.

Separately, the air gasper of the present invention may include a third housing disposed between the first housing and the second housing. The third housing is contemplated to be tiltable with respect to the first housing, thereby permitting angular adjustment of the air outlet.

In one contemplated embodiment, the air gasper includes a spherical surface surrounding the third housing. The first housing includes a spherical, inner surface complementary to the spherical surface surrounding the third housing.

In the embodiment where the air gasper includes a spherical surface surrounding the third housing, the spherical, inner surface of the first housing may be provided with a stopper that limits a tilting angle of the tertiary housing.

It is contemplated that the first mechanism may include a first biasing member disposed between the second housing and the third housing to bias the second housing in the deployed position.

In addition, it is contemplated that the first mechanism also has a locking mechanism to lock the first housing both in the deployed position and in the stowed position.

Still further, the first mechanism may be push-button actuated.

With respect to other embodiments of the present invention, the second mechanism in the air gasper may have a plug ring connected to the plug, a third threaded region on an exterior surface of the plug ring, and a fourth threaded region on an interior surface of the second housing. The third threaded region is contemplated to engage the fourth threaded region so that rotation of the second housing moves the plug ring and plug with respect to the air outlet.

As detailed herein, the second housing also may include a plug seat at the air outlet. If so, the plug is contemplated to engage the plug seat when in the closed position and be displaced a distance from the plug seat when in the opened position.

The air gasper of the present invention also may include a second biasing member disposed between the first housing and the plug ring to bias the plug ring toward the closed position.

It is contemplated that the air gasper may be used in an aircraft.

Furthermore, it is contemplated that the panel is an overhead panel in an aircraft cabin.

Further aspects of the present invention will be made apparent from the paragraphs that follow.

BRIEF DESCRIPTION OF THE DRAWING(S)

The present invention will now be described in connection with the drawing appended hereto, in which:

FIG. 14 is an exploded perspective illustration of elements of the secondary housing of the air gasper of the present invention.

DETAILED DESCRIPTION OF EMBODIMENT(S) OF THE INVENTION

Figure 1:
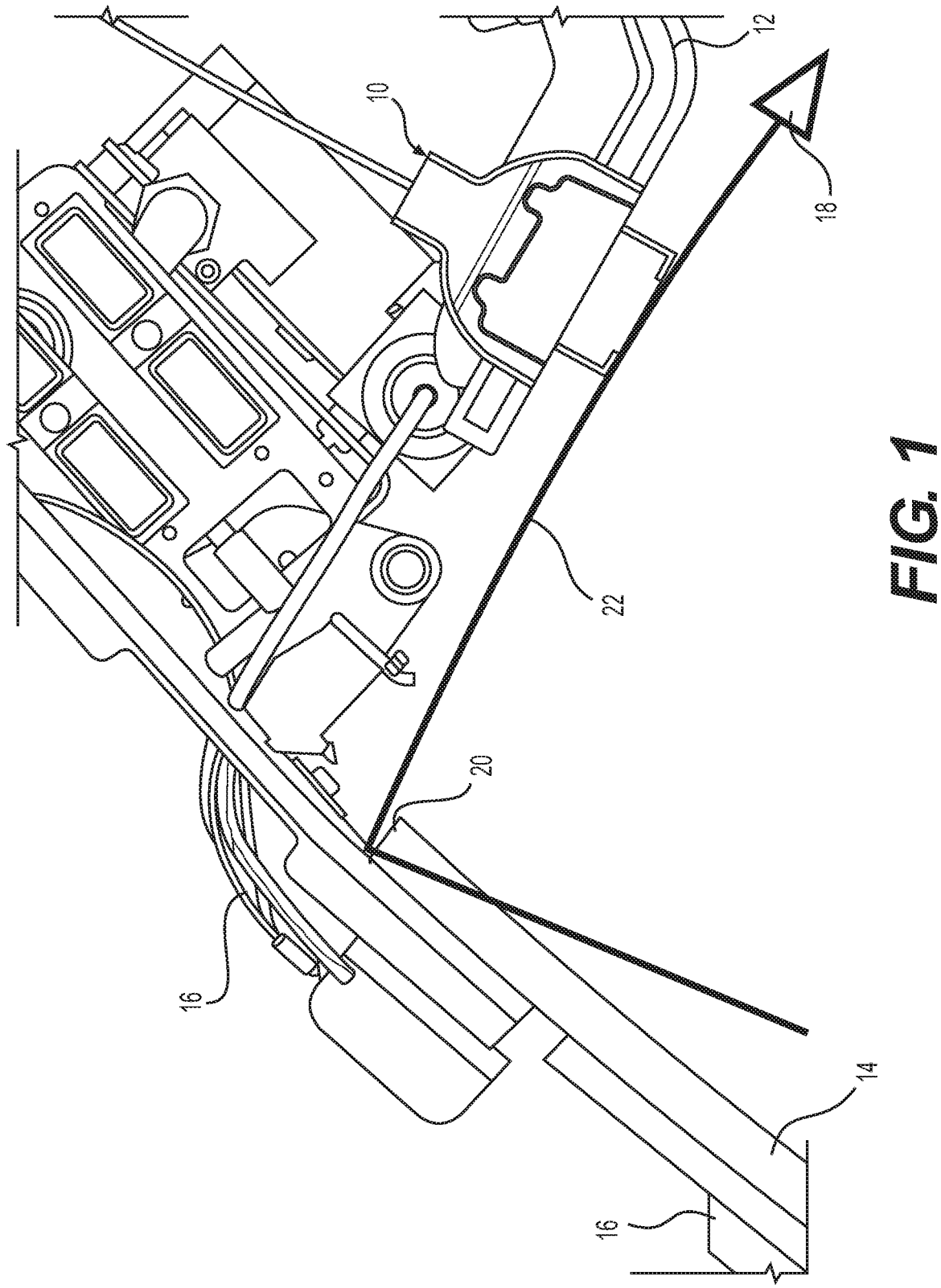
FIG. 1 is a cross-section of an interior of a cabin illustrating one potential location for placement of the air gasper of the present invention, also illustrating one problem to be solved by the present invention.

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the context of the construction of aspects of a cabin for an aircraft, such as a jet aircraft. While the invention is discussed in this context, the present invention is not intended to be limited solely to the cabins for jet aircraft. The present invention also is applicable to any other type of aircraft, as should be apparent to those skilled in the art. In addition, while discussed in the context of aircraft, the present invention may apply to vehicles other than aircraft, such as cars, buses, and trains.

While the invention will be described in conjunction with specific embodiments. It should be understood that the discussion of any one, particular embodiment is not intended to be limiting of the scope of the present invention. To the contrary, the specific, enumerated embodiments are intended to illustrate a wide variety of alternatives, modifications, and equivalents that should be apparent to those of ordinary skill in the art. The present invention is intended to encompass any such alternatives, modifications, and equivalents as if discussed herein.

In the following description, the same numerical references are intended to refer to similar elements. The re-use of reference numerals for different embodiments of the present invention is intended to simplify the discussion of the present invention. It should not be inferred, therefore, that the re-use of reference numbers is intended to convey that the associated structure is identical to any other described embodiment.

Although the preferred embodiments of the present invention as illustrated in the accompanying drawings comprise various components, and although the preferred embodiments of the system and corresponding parts of the present invention as shown consist of certain geometrical configurations as explained and illustrated herein, not all of these components and geometries are essential to the invention and, thus, should not be taken in their restrictive sense, i.e., should not be taken as to limit the scope of the present invention.

It is to be understood, as should be apparent to a person skilled in the art, that other suitable components and cooperations therebetween, as well as other suitable geometrical configurations, may be used for the air gasper according to the present invention, as will be briefly explained herein and as may be easily inferred therefrom by a person skilled in the art, without departing from the scope of the invention.

Additionally, it should be appreciated that positional descriptions such as "front," "rear," "right," "left," "top," "bottom," and the like are, unless otherwise indicated, to be taken in the context of the figures and should not be considered to be limiting of the present invention.

It will be appreciated that the present invention may be practiced without all of the specific details which are set forth herein below in order to provide a thorough understanding of the invention.

FIG. 1 illustrates the air gasper 10 (which may also be referred to as an air outlet, or air gasper outlet) of the present invention. This cross-sectional view is provided to illustrate one difficulty with aircraft construction that the present invention seeks to ameliorate.

With reference to FIG. 1, the air gasper 10 is position in a PSU overhead panel 12. Typically, the PSU overhead panel 12 is located such that a passenger in a seat may reach above his or her head to adjust the flow of air from the air gasper 10 for personal comfort.

An interior sidewall panel 14 is positioned immediately adjacent to the PSU overhead panel 12. The sidewall panel 14 covers one or more system components (i.e., electrical wires 16 and the like) that lie between the sidewall panel 14 and the fuselage wall of the aircraft. The sidewall panel 14 is contemplated to swing inwardly into the aircraft, in the direction of the arrow 18. The top edge 20 of the sidewall panel 14, therefore, sweeps along a line 22 adjacent to the PSU overhead panel 12.

As may be immediately apparent, the air gasper 10 lies very close to the line 22 swept by the top edge 20 of the sidewall panel 14. It is, therefore, predictable that the sidewall panel 14 might impact with the air gasper 10, thereby damaging the sidewall panel 14 and/or the air gasper 10 when the sidewall panel 14 is opened. If damaged, the air gasper 10 and/or the sidewall panel 14 may require replacement.

Still further, it is contemplated that a passenger might hit his or her head on the air gasper 10 when being seated or egressing from his or her seat. In such an instance, the passenger might hurt his or her head or damage the air gasper 10. In this regard, the air gasper 10 is spring-loaded (as discussed in greater detail below), thereby permitting retraction of a portion of the air gasper 10, which serves to limit damage to the air gasper 10 and/or the passenger.

The air gasper 10 of the present invention is constructed to present little or no structure that protrudes from the PSU overhead panel 12 when the air gasper 10 is in a stowed position. At least for this reason, the air gasper 10 of the present invention is constructed at least to avoid potential impact with the sidewall panel 14 when the sidewall panel 14 is opened and/or to minimize impact with a passenger. Other advantages of the construction of the air gasper 10 will be made apparent from the discussion that follows.

The various components of the air gasper 10 are contemplated to be made from any material deemed suitable for the cabin of the aircraft. The air gasper 10 may be made from plastics, metals, metal alloys, composite materials, ceramics, or any combination of these materials, among others. The air gasper 10 of the present invention is not considered to be limited to any particular material or materials for its construction, as should be apparent to those skilled in the art.

Figure 2:
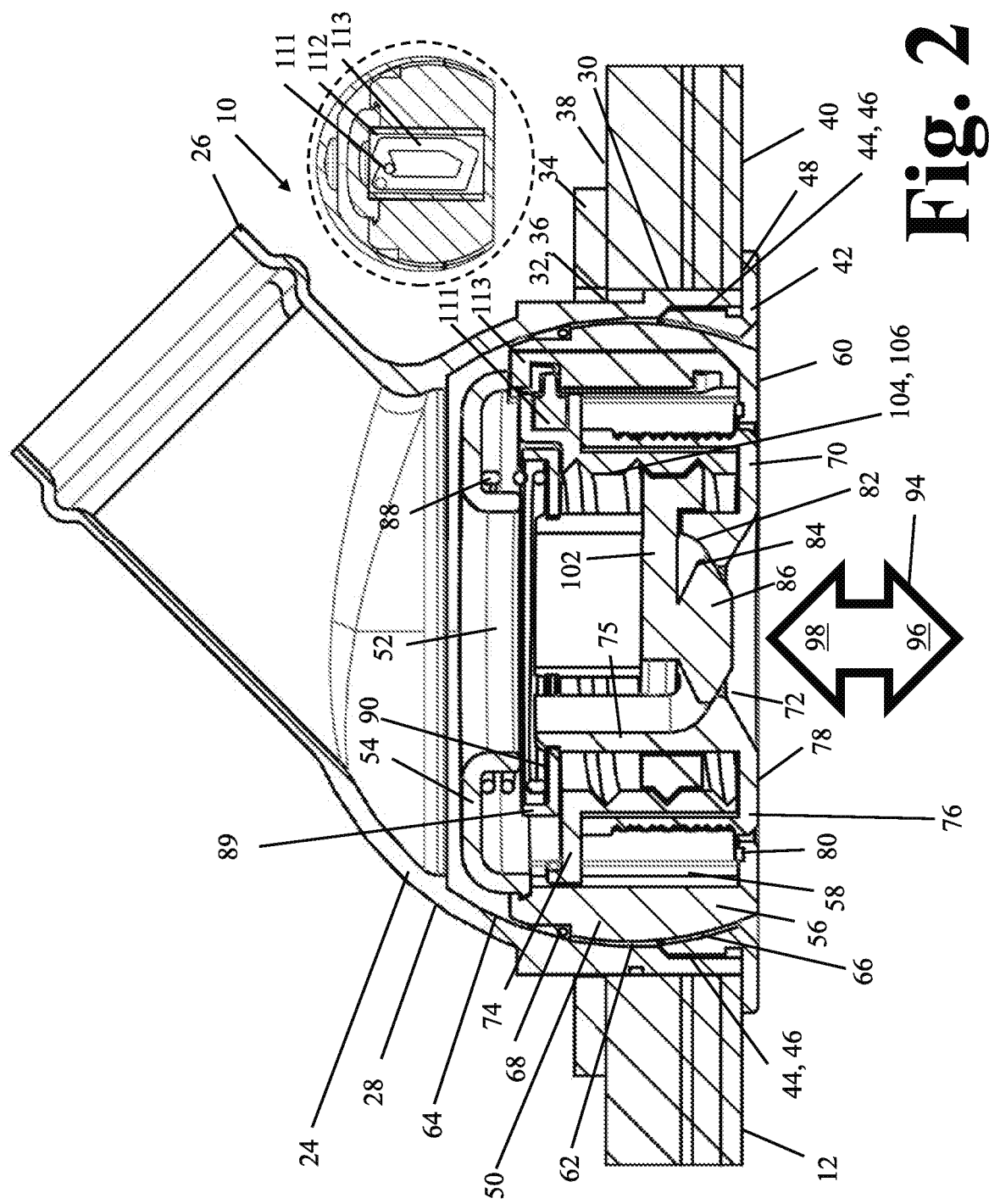
FIG. 2 is a cross-sectional side view of the air gasper of the present invention, showing the air gasper in a stowed, closed, and untilted position.

FIG. 2 is a cross-sectional side view of the air gasper 10 according to the present invention.

The air gasper 10 is positioned in the PSU overhead panel 12 such that the air gasper 10 occupies a hole in the PSU overhead panel 12. The air gasper 10 includes a primary housing 24 with an inlet 26 shown at the top end. The inlet 26 permits air to enter into the primary housing 24 so that the air may be directed in the cabin, as selected by the passenger. The inlet 26 may be connected to an air duct above the PSU overhead panel 12, as required or as desired.

The primary housing 24 includes a dome-shaped, upper section 28 that transitions to a cylindrically-shaped, lower section 30. The exterior surface of the dome-shaped upper section 28 includes a threaded region 32. A ring 34 includes an inner, threaded surface 36 that threadedly engages the threaded region 32. The ring 34 is, therefore, adjustably mounted on the primary housing 24. When the air gasper 10 is installed in the PSU overhead panel 12, the ring 34 abuts against the upper surface 38 of the PSU overhead panel 12. The ring 34 permits the air gasper 10 to be adjustably mounted against the PSU overhead panel 12, with respect to the upper surface 38, as should be apparent to those skilled in the art.

To hold the air gasper 10 against the lower surface 40 of the PSU overhead panel 12, the air gasper 10 includes an annular ring 42. The annular ring 42 has a threaded region 44 that engages a threaded region 46 on the interior surface of the cylindrically-shaped, lower section 30 of the primary housing 24. A lip 48 abuts against the lower surface 40 of the PSU overhead panel 12.

As should be apparent from FIG. 2, the PSU overhead panel 12 is sandwiched between the ring 34 and the lip 48 of the annular ring 42. Since both the ring 34 and the annular ring 42 are threadedly attached to the primary housing 24, each ring 34, 42 separately allows for adjustable positioning of the air gasper 10 with respect to the PSU overhead panel 12. Moreover, by sandwiching the PSU overhead panel 12 between the ring 34 and the annular ring 42, the air gasper 10 is contemplated to be securely held in position in the PSU overhead panel 12.

The air gasper 10 includes a tertiary housing 50 located within the primary housing 24. The tertiary housing 50 has the shape of an inverted cup with a central opening 52. The central opening 52 permits air to pass from the inlet 26, through the tertiary housing 50. The tertiary housing 50 includes an upper section 54 and a lower section 56. The lower section 56 includes an exterior, spherical surface 62 that abuts against an inner spherical surface 64 of the primary housing 24. The lower section 56 defines a tertiary lip 60. When the air gasper 10 is in the untilted position, as illustrated in FIG. 2, the tertiary lip 60 is flush with the annular ring 42.

The lower section 56 of the tertiary housing 50 has a spherical shape due to the exterior spherical surface 62. The spherical surface 62 of the tertiary housing 50 compliments the inner, spherical surface 64 defined by the primary housing 24 and also the inner, spherical surface 66 defined by the annular ring 42. As discussed in greater detail below, the spherical surface 62 facilitates tilting of the tertiary housing 50 within the primary housing 24. As a result, the direction of the air flow from the air gasper 10 may be manually adjusted by the passenger according to his or her personal preference.

As illustrated in FIG. 2, a seal 68 (such as an O-ring or other suitable sealing member, whether circular or not) provides a seal between the spherical surface 62 and the complimentary spherical surfaces 64, 66. The seal 68 discourages air from being discharged from the air gasper 10 by passing between the spherical surface 62 and the primary housing 24 and/or the annular ring 42. In addition, the seal 68 establishes a proper coefficient of friction between the tertiary housing 50 and the primary housing 24, which is helpful for the turning of the twist knob 76, described in greater detail below.

A secondary housing 70 is disposed within the tertiary housing 50. The secondary housing 70 is a cup-shaped structure with a central opening 72. Air passing through the air gasper 10 is permitted to exit from the air gasper 10 through the central opening 72. The secondary housing 70 includes a twisting knob 76 linked to a fixed housing 74 via an annular insert 89. The bottom surface of the twisting knob 76 defines the secondary lip 78. When the air gasper 10 is in the stowed position, the secondary lip 78 is flush with the tertiary lip 60 and the primary lip 42, as illustrated.

A seal 80 (such as an O-ring or other suitable sealing member, whether circular or not) is positioned between the outer wall 76 of the secondary housing 70 and the annular ring 58. The seal 80 discourages and/or prevents air from flowing between the secondary housing 70 and the annular ring 58.

The inner wall 74 of the secondary housing 70 includes a tapered region 82 that extends inwardly from the inner wall 74 to define a sealing surface 84. A plug 86 engages the sealing surface 84 (also referred to as a plug seal 84) when the air gasper 10 is in the closed position, as illustrated. In the closed position, the plug 86 engages the plug seal 84 and prevents air from being discharged through the central opening 72.

The secondary housing 70 is contemplated to be spring-loaded within the primary housing 24 such that the secondary housing 70 moves in the direction of the arrows 94. In particular, a spring 88 is disposed between the upper section 54 of the tertiary housing 50 and an upper surface 90 of the annular insert 89 that is disposed on top of the secondary housing 70. The spring 88 biases the secondary housing 70 in the direction of the arrow 96.

The secondary housing 70 in the air gasper 10 is contemplated to be actuated by a pressing action on the secondary lip 78. When a person presses on the secondary lip 78 in the direction of the arrow 98, it is contemplated that the secondary housing 70 will be unlocked from the stowed position illustrated in FIG. 2 and will transition to the deployed position illustrated in FIG. 4. To stow the secondary housing 70 into the primary housing 24, the passenger need only press again on the secondary lip 78 in the direction of the arrow 98.

So that the secondary housing 70 may transition between the stowed position and the deployed position, a sliding pin 111 (which could be spring loaded to return to its nominal position), nested into the fixed housing 74, follows a heart shaped cam track 113 inside the cam insert 112, which is nested into the lower section 56 of the tertiary housing 50. Together, the sliding pin 111, the cam path 113 and the spring 88 (among other elements) function as a locking mechanism that facilitates the transition of the secondary housing 70 between the stowed position and the deployed position. The exact construction of the spring-actuated locking mechanism for the secondary housing 70 is not critical to the present invention. Any spring-actuated locking mechanism may be employed without departing from the scope of the present invention. Separately, other locking mechanisms may be employed, whether spring-loaded or not, without departing from the scope of the present invention.

In the upper, right-hand side of FIG. 2, an insert is provided within dotted lines. The insert is provided to illustrate the position of the sliding pin 111, cam insert 112, and cam path 113 discussed above. As should be apparent, the insert illustrates the position of the relevant elements for the stowed position of the secondary housing 70.

Figure 3:
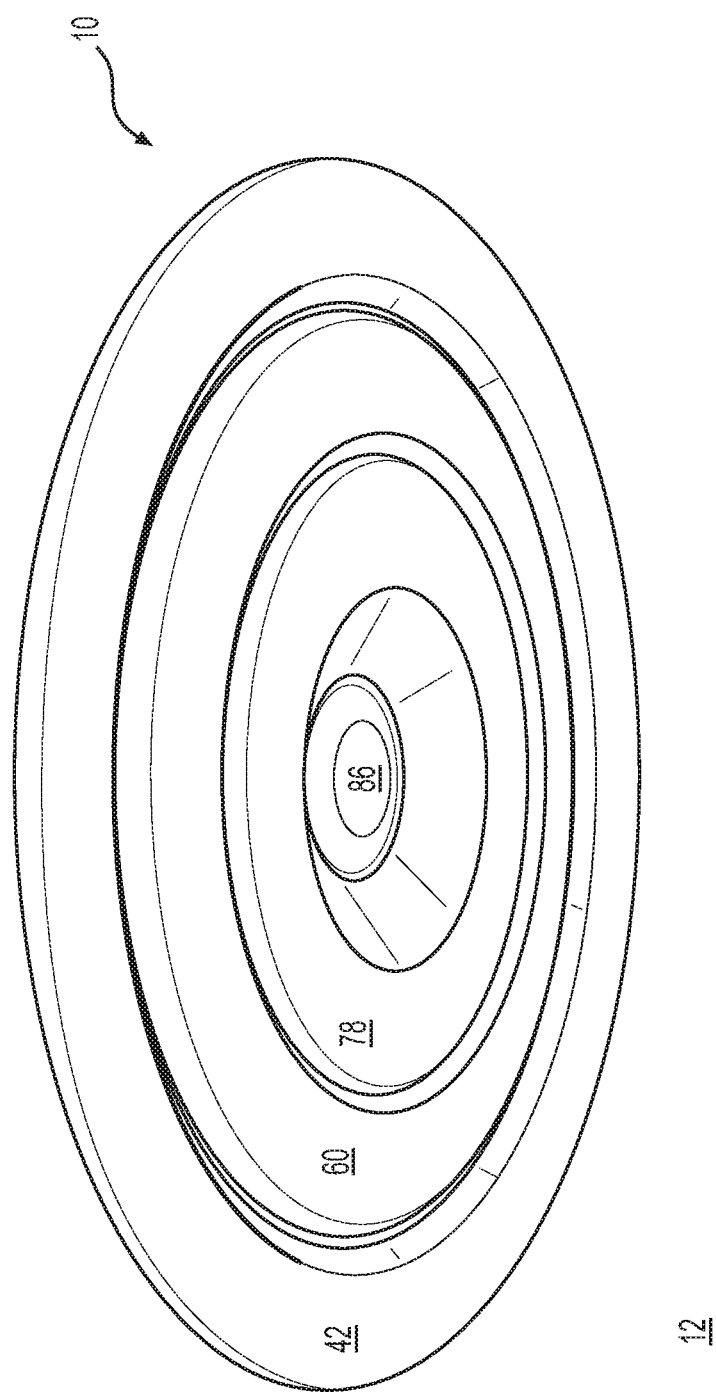
FIG. 3 is a perspective illustration of the air gasper of the present invention, providing an exterior detail of the air gasper in the stowed, closed, and untilted position.

FIG. 3 provides a perspective illustration of a contemplated exterior view of the air gasper 10 in the stowed, closed, and untilted position illustrated in FIG. 2. As illustrated, the primary lip 42, the tertiary lip 60 and the secondary lip 78 are flush with one another and form a substantially planar surface parallel with the lower surface 40 of the PSU overhead panel 12.

Figure 4:
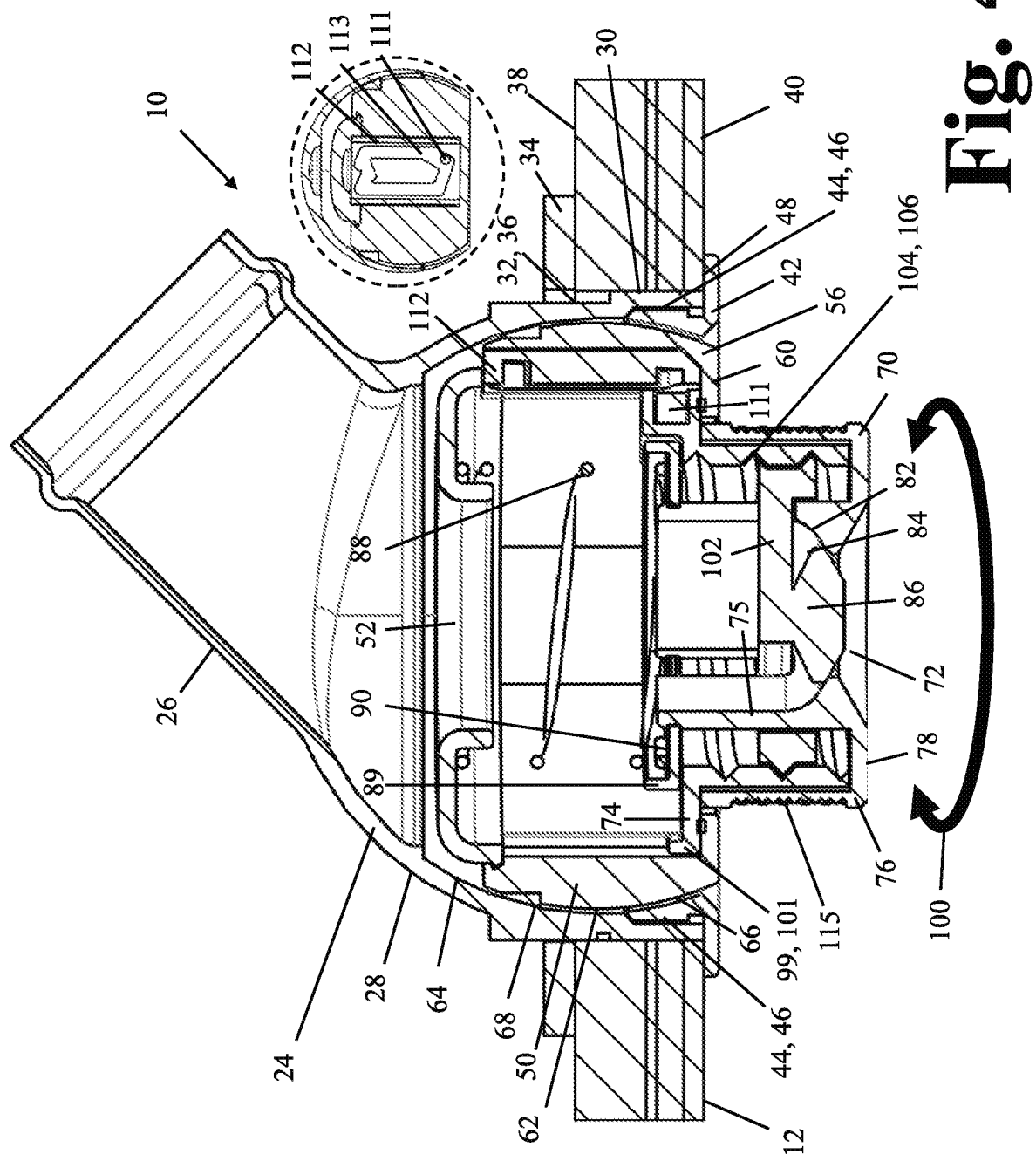
FIG. 4 is a cross-sectional side view of the air gasper of the present invention, showing the air gasper in the deployed, closed, and untilted position.

FIG. 4 is a cross-sectional side view of the air gasper 10 illustrated in FIG. 2. In this view, the air gasper 10 is illustrated in the deployed, closed, untilted position.

In the upper, right-hand side of FIG. 4, an insert is provided within dotted lines. The insert is provided to illustrate the position of the sliding pin 111, cam insert 112, and cam path 113 discussed above. As should be apparent, the insert illustrates the position of the relevant elements for the deployed position of the secondary housing 70.

As illustrated in FIG. 4, the secondary housing 70 may be rotated in the direction of the arrows 100 to open or close the air gasper 10. For operation of the illustrated air gasper 10, the plug 86 is connected to a plug ring 102 that includes threads 104 on an exterior side. The threads 104 engage threads 106 on the interior surface of the fixed housing 74. The plug ring 102 moves in the direction of the arrows 94 in response to rotation of the twisting knob 76 in the direction of the arrows 100. Slots on the twisting knob 76 push against the ribs of the plug ring 102 to cause the plug ring 102 to move up and down, following the threads 104, 106. The plug 86 moves together with the plug ring 102.

For proper functioning of the circular ring 102, the secondary housing 70 remains fixed to the tertiary housing 50 when the twisting knob 76 is turned. This is achieved by providing studs 99 on the fixed housing 74 and corresponding slots 101 on the lower section 56 of the tertiary housing 50. At the same time, the circular ring 68 prevents the tertiary housing 50 from turning with respect to the primary housing 24, by having a higher coefficient of friction than the coefficient of friction required to turn the twisting knob 76.

Figure 6:
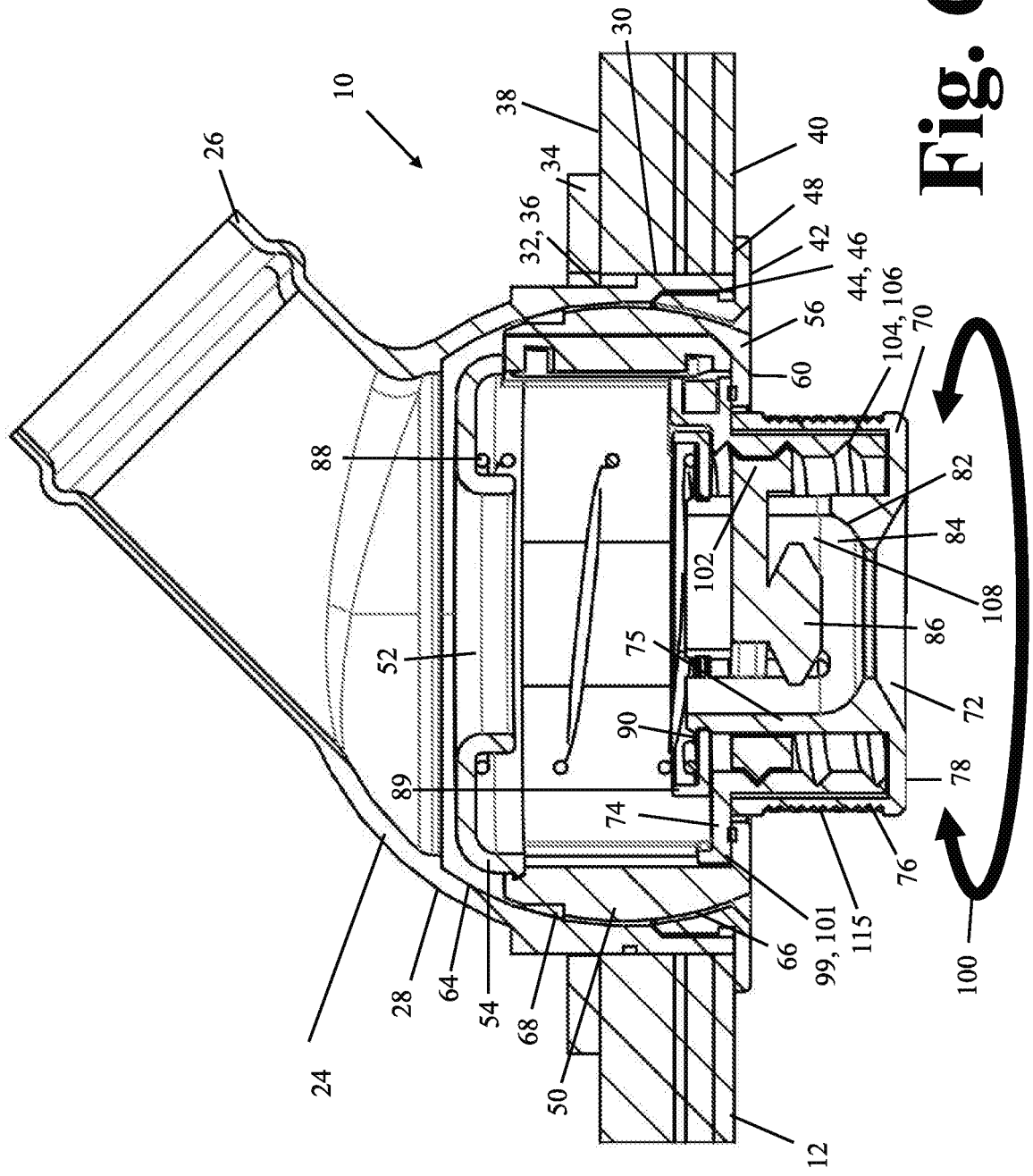
FIG. 6 is a cross-sectional side view of the air gasper of the present invention, showing the air gasper in the deployed, opened, and untilted position.

As indicated in connection with FIG. 4, the plug 86 is in the closed position, meaning that the plug 86 seats on the plug seat 84, thereby inhibiting the flow of air through the air gasper 10. However, after turning the twisting knob 76 in one of the directions indicated by the arrows 100, the plug 86 may be unseated from the plug seat 84 to permit air to flow through a gap 108 between the plug 86 and the plug seat 84, as illustrated in FIG. 6. The gap 108 permits air to flow through the air gasper 10. The larger the gap 108, the greater the air flow through the air gasper 108.

As may be apparent from the foregoing, the plug ring 102 and secondary housing 70 cooperate together (along with other elements of the air gasper 10) and act as a mechanism that permits the plug 86 to transition between the closed position and the opened position.

Figure 5:
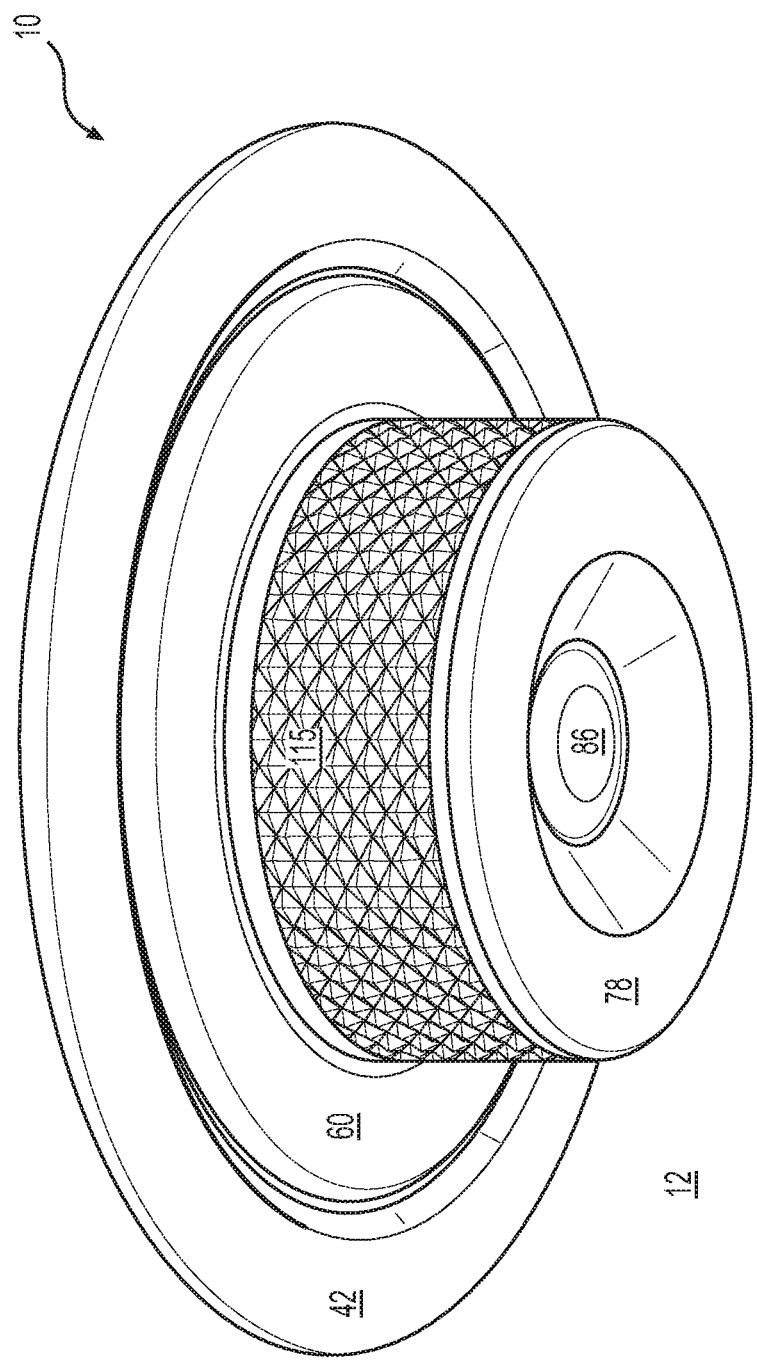
FIG. 5 is a perspective illustration of the air gasper of the present invention, providing an exterior detail of the air gasper in the deployed, closed, and untilted position.

FIG. 5 is a perspective illustration, showing the air gasper 10 in the deployed, closed, untilted position, consistent with the illustration in FIG. 4. The exterior surface of the twisting knob 76 includes a knurled surface 115 to facilitate rotation of the twisting knob 76 of the secondary housing 70 in the direction of the arrows 100. As should be apparent, a knurled surface 115 is not required to practice the present invention.

FIG. 6 is a cross-sectional side view of the air gasper 10 of the present invention. In this view, the air gasper 10 is illustrated in the deployed, opened, and untilted position. The gap 108 is visible in this view. As noted above, the gap 108 permits air to pass through the air gasper 10.

Figure 7:
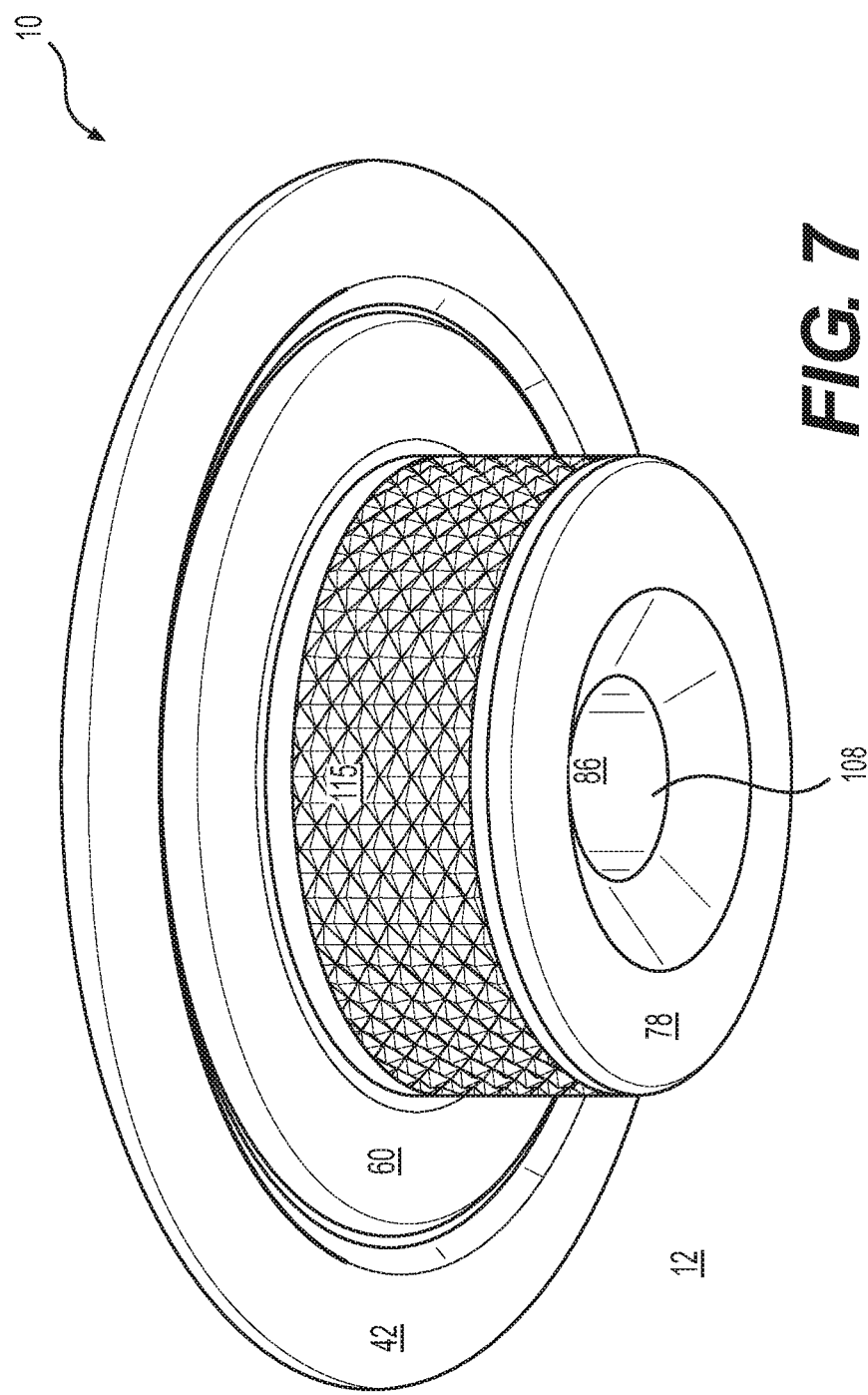
FIG. 7 is a perspective illustration of the air gasper of the present invention, providing an exterior detail of the air gasper in the deployed, opened, and untilted position.

FIG. 7 is a perspective, exterior view of one contemplated embodiment of the air gasper 10 of the present invention. Consistent with the illustration in FIG. 6, the air gasper 10 is shown in the deployed, opened, untilted position.

Figure 8:
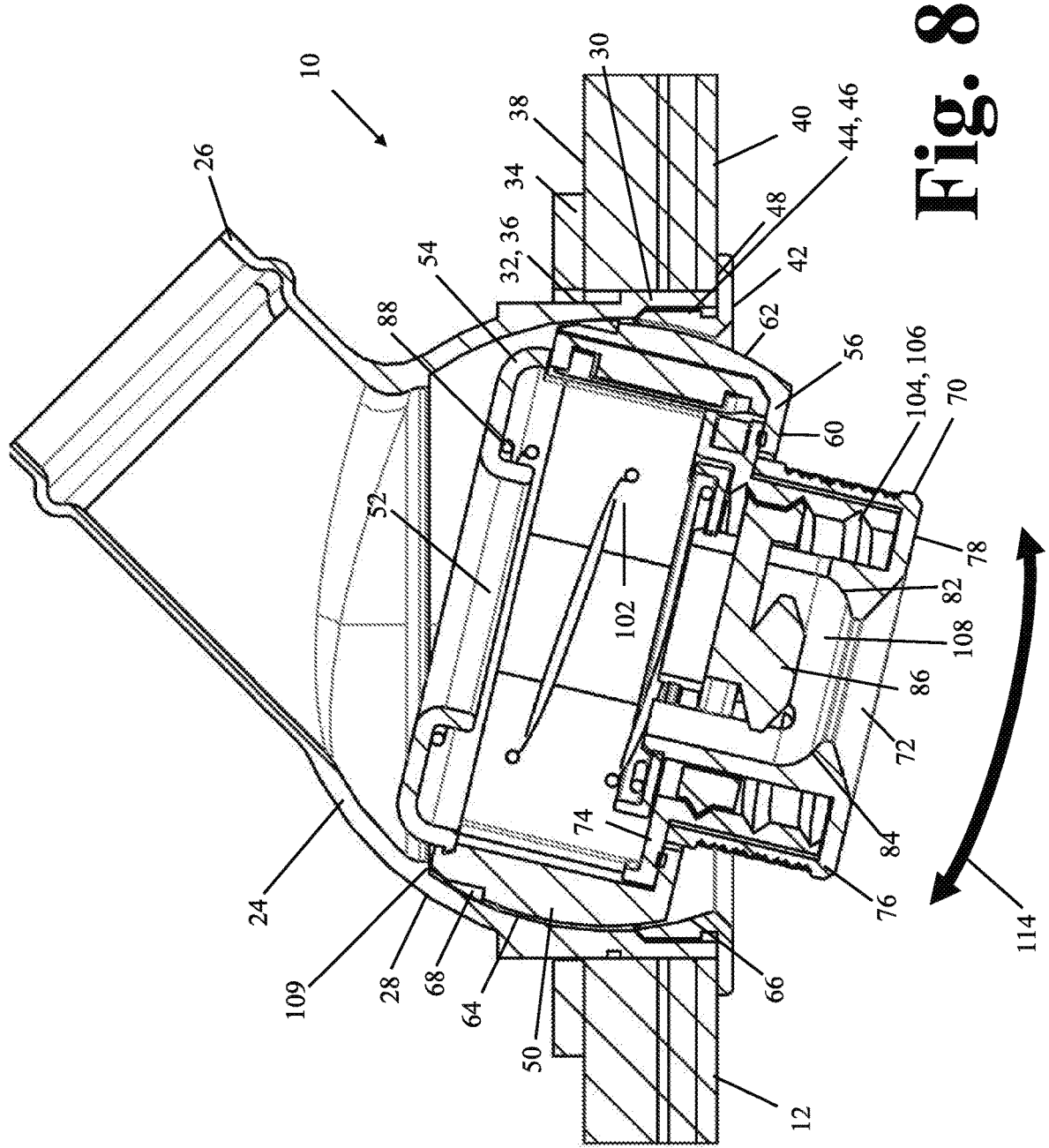
FIG. 8 is a cross-sectional side view of the air gasper of the present invention, showing the air gasper in the deployed, opened, and tilted position.

FIG. 8 is a cross-sectional view of the air gasper 10 of the present invention, with the air gasper 10 being illustrated in the deployed, opened, tilted position. Due to the interaction between the spherical surface 62 of the tertiary housing 50 and the spherical surfaces 64, 66, the primary housing 24, the tertiary housing 50, and the secondary housing 70 are permitted to tilt within the primary housing 24, as illustrated. The tilting directions are indicated by the arrows 114. A stopper feature 109 on the primary housing 24 limits the tilting angle of the tertiary housing 50 so that secondary housing 70 and the twisting knob 76 never touch nor damage the primary housing bezel 42.

Figure 9:
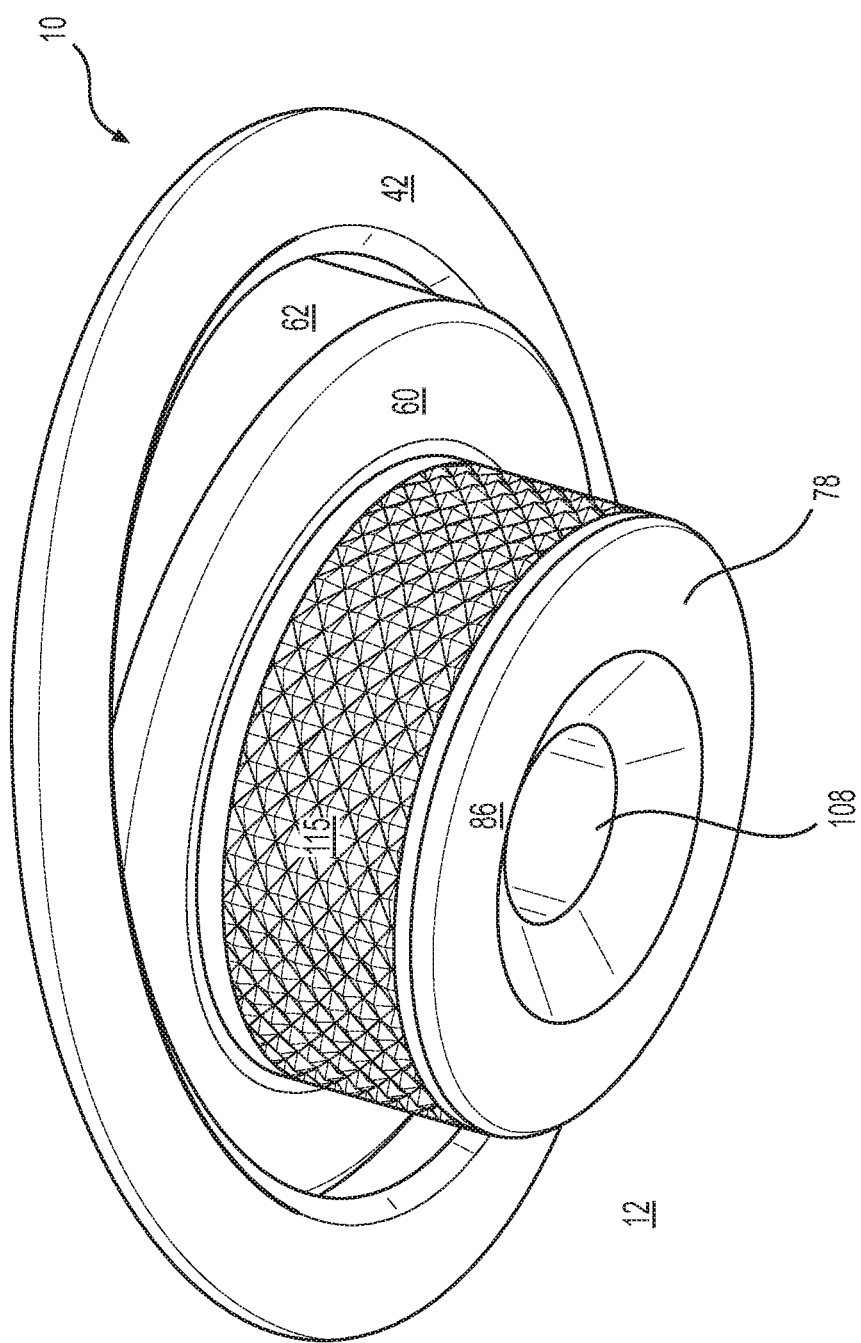
FIG. 9 is a perspective illustration of the air gasper of the present invention, providing an exterior detail of the air gasper in the deployed, opened, and tilted position.

FIG. 9 is an exterior perspective illustration of the air gasper 10 illustrated in FIG. 8. Consistent with FIG. 8, the air gasper 10 is illustrated in the deployed, opened, and tilted position.

Figure 10:
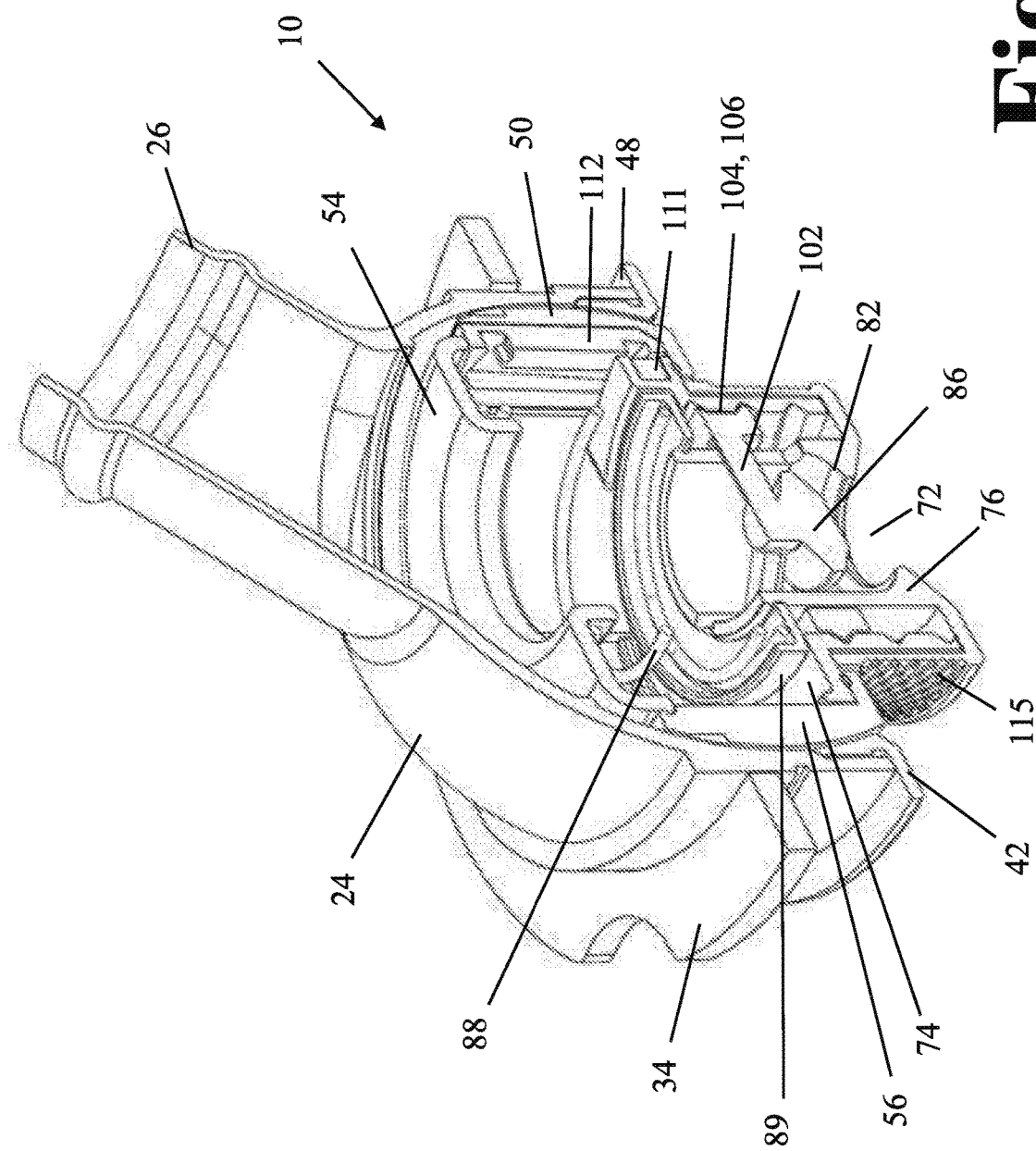
FIG. 10 is a perspective, cross-sectional illustration of the air gasper of the present invention, with the air gasper being shown in the deployed, opened, untilted position.

FIG. 10 is a perspective, cross-sectional illustration of the air gasper 10 of the present invention. The air gasper 10 is shown in the deployed, opened, untilted position.

Figure 11:
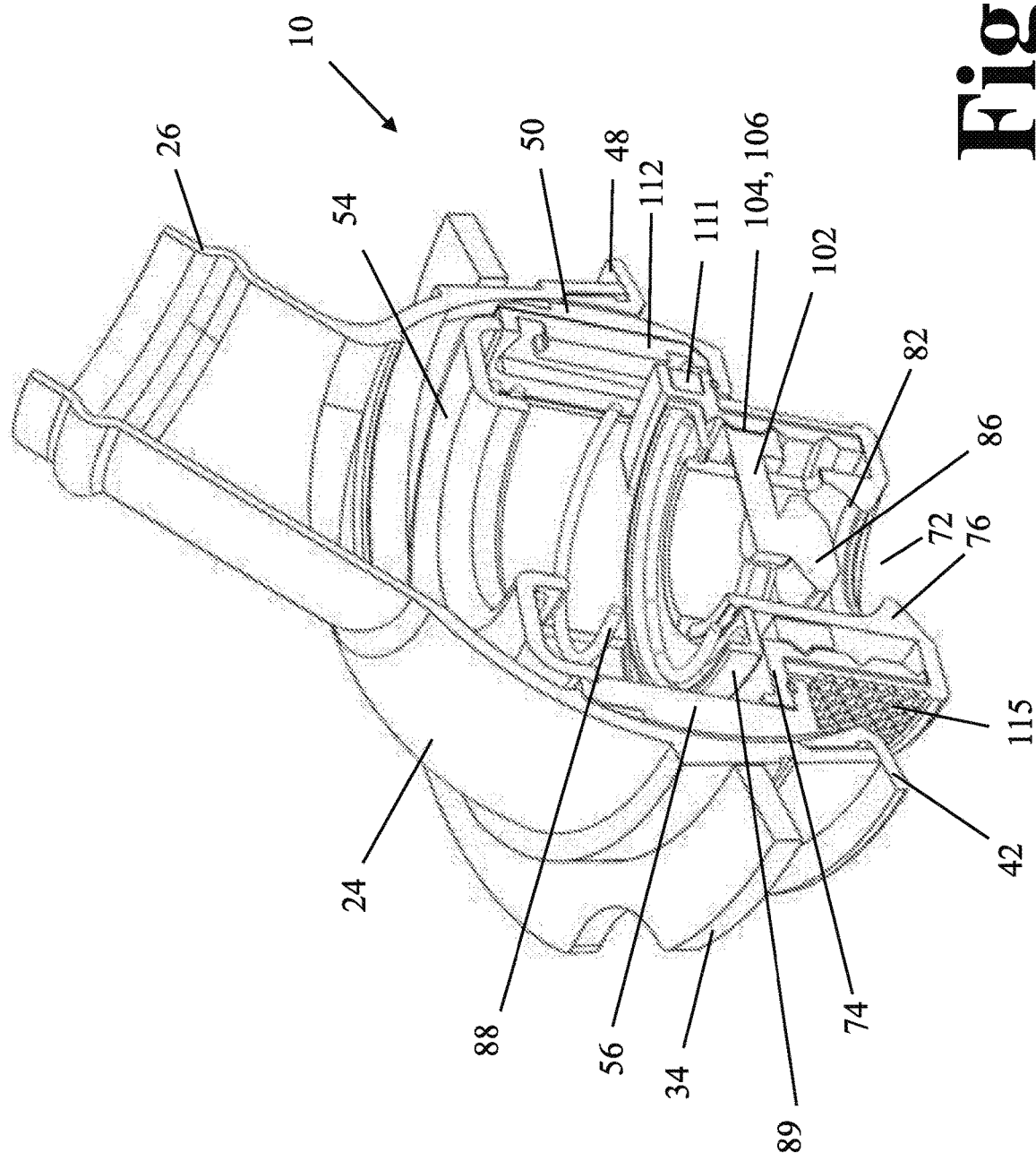
FIG. 11 is a perspective, cross-sectional illustration of the air gasper of the present invention, with the air gasper being shown in the deployed, opened, tilted position.

FIG. 11 is a perspective, cross-sectional illustration of the air gasper 10 of the present invention. The air gasper 10 is shown in the deployed, opened, tilted position.

Figure 12:
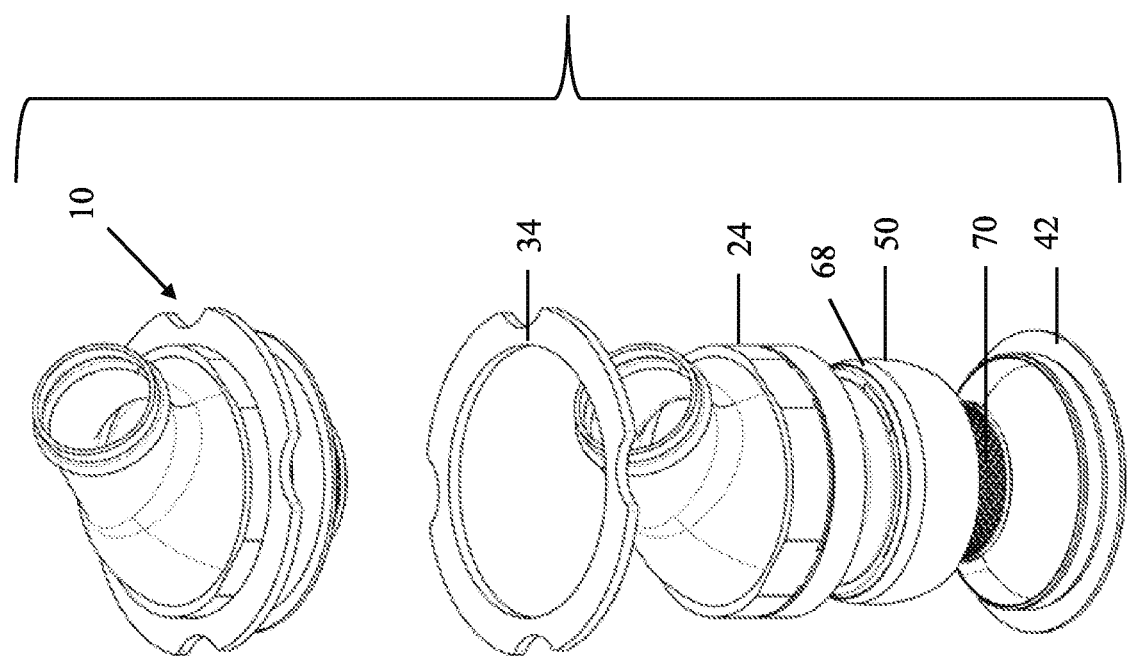
FIG. 12 is an exploded perspective illustration of elements of the air gasper of the present invention.

FIG. 12 is an exploded perspective illustration of elements of the air gasper 10 of the present invention.

Figure 13:
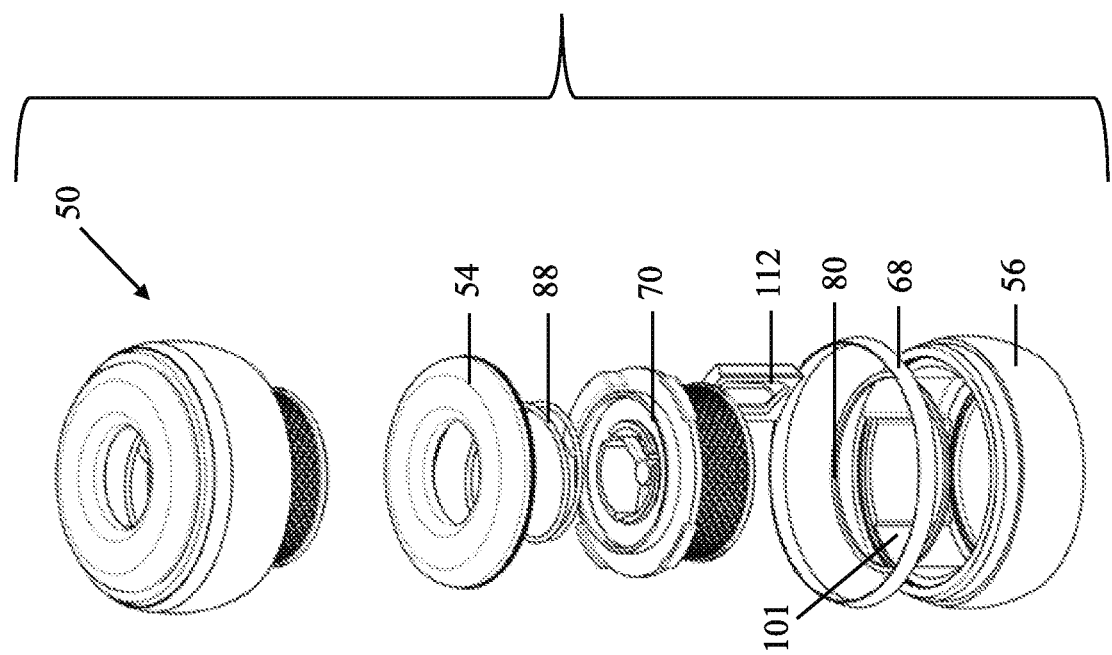
FIG. 13 is an exploded perspective illustration of elements of the secondary and tertiary housings of the air gasper of the present invention.

FIG. 13 is an exploded perspective illustration of elements of the secondary and tertiary housings of the air gasper of the present invention.

FIG. 14 is an exploded perspective illustration of elements of the secondary housing of the air gasper of the present invention.

With respect to the various embodiments discussed above, one or more of the features from the embodiments may be employed together without departing from the scope of the present invention.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. An air gasper assembly for a vehicle, comprising:
a panel; and
an air gasper positioned within the panel, the air gasper comprising:
an air inlet;
a first housing disposed through the panel, the first housing being connected to the air inlet;
a second housing disposed within the first housing;
an air outlet disposed within the second housing, downstream of the air inlet;
a plug associated with the air outlet and movable between an opened position and a closed position to respectively open and close the air outlet; and
wherein:
the second housing is movable relative to the first housing between: a stowed position where the second housing is stowed within the first housing; and a deployed position where the second housing is extended outwardly from the first housing;
a spring biases the second housing toward the deployed position:
in the deployed position of the second housing, the plug is movable between the opened position for permitting air to exit the air outlet and the closed position for preventing air from exiting the air; and
the first housing comprises a first lip and the second housing comprises a second lip, the first lip and the second lip being substantially flush when the second housing is in the stowed position and the air outlet is closed; and
the first lip of the first housing abuts against the panel.

2. The air gasper assembly of claim 1, further comprising:
a first threaded region on an exterior surface of the first housing;
a second threaded region on an interior surface of the first housing;
a first ring engageable with the first threaded region; and
a second ring engageable with the second threaded region,
wherein the first ring and the second ring sandwich the panel therebetween to removably secure the first housing to the panel.

3. The air gasper assembly of claim 1, wherein the second housing is lockable both in the deployed position and in the stowed position.

4. The air gasper assembly of claim 1, further comprising:
a plug ring connected to the plug;
a first threaded region on an exterior surface of the plug ring; and
a second threaded region on an interior surface of the second housing,
wherein the first threaded region engages the second threaded region so that rotation of the second housing moves the plug ring and plug with respect to the air outlet.

5. The air gasper assembly of claim 4, wherein the second housing further comprises:
a plug seat at the air outlet,
wherein the plug engages the plug seat when in the closed position, and
wherein the plug is displaced a distance from the plug seat when in the opened position.

6. The air gasper assembly of claim 1, further comprising:
a third housing disposed between the first housing and the second housing, wherein the third housing is tiltable with respect to the first housing, thereby permitting angular adjustment of the air outlet.

7. The air gasper assembly of claim 6, further comprising:
a spherical surface surrounding the third housing,
wherein the first housing comprises a spherical, inner surface complementary to the spherical surface.

8. The air gasper assembly of claim 7, wherein the spherical, inner surface of the first housing comprises a stopper that limits a tilting angle of the third housing.

9. The air gasper assembly of claim 1, wherein the vehicle is an aircraft.

10. The air gasper assembly of claim 1, wherein the panel is an overhead panel in an aircraft cabin.

11. The air gasper assembly of claim 1, further comprising a twisting knob for opening and closing the air outlet.

12. The air gasper assembly of claim 11, wherein a bottom surface of the twisting knob defines the second lip.

13. The air gasper assembly of claim 11, wherein actuation of the twisting knob causes a plug associated with the air outlet to be displaced in relation to the air outlet.

14. The air gasper assembly of claim 1, wherein when in the deployed position, the second housing extends outwardly from the panel into the vehicle.

15. The air gasper assembly of claim 1, wherein the first and second lips form a substantially planar surface parallel with a lower surface of the panel for facing an interior of the vehicle.

* * * * *